(12) United States Patent
Yun

(10) Patent No.: US 7,724,882 B2
(45) Date of Patent: May 25, 2010

(54) METHOD FOR PROVIDING CALL INTERMEDIATION SERVICES AND SYSTEM THEREFORE

(76) Inventor: Phil Hwan Yun, 532-23 Myeonmok, 7-dong, Jungnang-gu, Seoul 131-207 (KR)

( * ) Notice: Subject to any disclaimer, the term of this patent is extended or adjusted under 35 U.S.C. 154(b) by 1089 days.

(21) Appl. No.: 11/353,322

(22) Filed: Feb. 14, 2006

(65) Prior Publication Data

US 2006/0182243 A1     Aug. 17, 2006

(30) Foreign Application Priority Data

Feb. 17, 2005    (KR) ...................... 10-2005-0013267

(51) Int. Cl.
*H04M 15/00* (2006.01)
*H04M 3/42* (2006.01)
*H04L 12/66* (2006.01)
(52) U.S. Cl. ............................. 379/114.01; 379/210.01; 370/352
(58) Field of Classification Search ............ 379/114.01, 379/114.13, 201.01, 201.02, 210.01, 265.09; 370/352
See application file for complete search history.

(56) References Cited

U.S. PATENT DOCUMENTS

| 6,704,403 B2 * | 3/2004 | Lurie et al. ............... 379/114.1 |
| 7,240,290 B2 * | 7/2007 | Melideo ..................... 715/764 |

FOREIGN PATENT DOCUMENTS

| EP | 1849131 A1 * | 10/2007 |
| JP | 2006229964 A * | 8/2006 |
| KR | 1020010035194 A | 5/2001 |
| KR | 1020040001216 A | 1/2004 |

* cited by examiner

*Primary Examiner*—Quoc D Tran
(74) *Attorney, Agent, or Firm*—Brown & Michaels, PC

(57) ABSTRACT

Disclosed is a method and system for providing call intermediation services. The method for providing the call intermediation services allows a user to automatically make a call with a company if a user inputs only the telephone number on the web. After confirming the company profile of the Internet portal site, a user can speak by telephone with a person in charge of a company without a waiting time for call connection, and the user can rapidly acquire necessary information by means of query and response.

19 Claims, 12 Drawing Sheets

METHOD FOR PROVIDING CALL INTERMEDIATION SERVICES AND SYSTEM THEREFORE

BACKGROUND OF THE INVENTION (a) Field of the Invention

The present invention relates to a method for providing call intermediation services and system therefore. More particularly, the present invention relates to a method for providing call intermediation services and system which can allow a user to automatically make a call to a person in charge of a company if a user inputs only a telephone number on the web.

(b) Description of the Related Art

Recently, most Internet portal sites provide the company profile retrieval service for users. The company profile retrieval service means that the firm name, the telephone number, and the information of the position of the searched company are provided to a user computer if a firm name or a category of business of the company which a user tries to search is inputted as a search word. A user can confirm the location of the corresponding company through the searched result. Moreover, a user may telephone the company by using the telephone number and then make inquiries to the person in charge.

In the meantime, in order to telephone the corresponding company by using the company profile provided by the above-described Internet portal sites, a user should confirm a telephone number in the company profile, and then dial by pushing buttons on a telephone or a mobile phone one by one, so inconveniently.

Moreover, there is a problem that a user should wait until the person in charge of a company answers the telephone. Moreover, there is a problem that in case the person in charge of a company does not instantly receive a telephone, a user should wait for several ten seconds without making any conversation by telephone.

In case the line is busy for a long time or a user fails to make a call, it may damage the company image or cause loss on sales. Particularly, in case a company giving the delivery service using a telephone order, it may cause enormous loss on sales.

As an attempt for solving the inconvenience that a user has to input a company telephone number in order to call a company on the telephone, Korean Laid-open Patent Publication No. 2001-35194 discloses 'Web Service using One Click Auto Dialing'. Concretely, this document suggests a technique using a PC-to-Phone telephone service which automatically dials to a company if a user clicks a banner ad or a telephone number on the web. When using this technique, a user can make a call to a person in charge of a company by clicking with the use of an I/O unit of a computer without any need of inputting a telephone number in a separate telephone terminal. But the technique of the above document has a problem that a user cannot use the service in case an audio input unit (microphone) is not equipped in a computer. Moreover, although the technique of the above document is used, there still remains an inconvenience that the user should wait until receiving a response to the call.

Korean Laid-open Patent Publication No. 2004-1216 discloses 'The method of the advertisement and call connection according to user's current location in next generation network'. Concretely, this document discloses a method for providing a map of nearby companies in case a subscriber demands a company guideline, and then connecting a call between the subscriber and the company in case a subscriber demands the call connection. But this document shows problems that only profiles of companies existing nearby a current position of the subscriber, and thus the subscriber cannot be connected to other common companies because this technique is linked to a map. Moreover, the above document still shows the problem that a user needs to wait for call connection since the user is an originator, even if the user need not press buttons one by one as in the Korean Laid-open Patent Publication No. 2001-35194.

SUMMARY OF THE INVENTION

The present invention is designed to solve the above described problems, and therefore it is an object of the present invention to provide a method and system for providing call intermediation services which can allow a user to make a call to a person in charge of a company by inputting only a telephone number on the web without waiting for call connection.

It is another object of the present invention to provide a method and system for providing call intermediation services which provide a telephone call service connected to company profiles of the internet portal sites.

To achieve the above object, A method for providing call intermediation services using a call intermediation services providing system connected to a portal server to mediate a call between a user telephone terminal and a company telephone terminal, the method comprises (a) receiving call intermediation request information including user telephone number and business identification code from the user telephone terminal via the portal server transmitted from a user who confirms company profile provided by the portal server through the user terminal; (b) requesting a call to the company telephone terminal by using company telephone number corresponding to the business identification code; (c) in case the company telephone terminal answers to the call and then a first channel is established between the call intermediation services providing system and the company telephone terminal in response to the call, putting the first channel into a standby state and requesting a call to the user telephone terminal by using the user telephone number; (d) in case the user telephone terminal answers to the call and then a second channel is established between the call intermediation services providing system and the user telephone terminal, connecting the first channel with the second channel; and (f) calculating a call intermediation charge based on a call intermediation history in case the call is successfully made between the user telephone terminal and the company telephone terminal.

The step (a) includes (a1) the portal server receiving a request for searching company profile from a user who accesses the portal server using the user terminal; (a2) the portal server providing the searched company profile and call intermediation services availability of each company to the user terminal; (a3) the portal server providing a page for inputting user telephone number, which is an identification code of the user telephone terminal, to the user terminal in case the user selects any company profile and then requests for the call intermediation by using the user terminal; (a4) the portal server receiving a user telephone number from the user terminal in case the user inputs the user telephone number through the input page; and (a5) the call intermediation services providing system receiving call intermediation request information including the identification code of the company chosen by the user and the user telephone number from the user terminal in case the portal site transmits the call intermediation request information.

In the step (a3), in case the portal server confirms whether a user account or cookie file for the portal server exists in the user terminal or the portal server and it is confirmed that the cookie file exists, the portal server provides a user telephone number stored in the user account or cookie file to the user terminal together with a page for inputting a user telephone number that is an identification code of the user telephone terminal.

The step (a) includes (a1) the portal server receiving a request for searching company profile from a user who accesses the portal server using the user terminal; (a2) the portal server providing the searched company profile, a homepage link of each company and the call intermediation services availability of each company to the user terminal; (a3) the portal server providing a homepage of the company and a call intermediation request button for the intermediation request to the user terminal in case the user selects the homepage link of the specific company through the user terminal; (a4) the portal server providing a page for inputting a user telephone number, which is an identification code of the user telephone terminal, to the user terminal in case the user selects the call intermediation request button and requests for the call intermediation; (a5) the portal server receiving a user telephone number from the user terminal in case the user inputs the user telephone number through the input page; and (a6) the call intermediation services providing system receiving call intermediation request information including the identification code of the company chosen by the user and the user telephone number in case the portal server transmits the call intermediation request information.

After the step (a) and before the step (b), further comprises the call intermediation services providing system confirming whether or not the user possesses the user telephone terminal by confirming whether an authentication number transmitted to the user telephone terminal is coincided with an authentication number inputted through the user terminal or not in case ARS (Automatic Response Service) is used, or by confirming whether an authentication number transmitted to the user telephone terminal in a short message is coincided with an authentication number inputted through the user terminal or not in case a mobile communications terminal is used.

After the step (a) and before the step (b), further comprises the call intermediation services providing system confirming whether or not the user is an authentic subscriber of the user telephone terminal by receiving an identification code of the subscriber of the user telephone terminal from the user telephone terminal and transmitting the identification code of the subscriber of the user telephone terminal to a communications corporation server in which the user telephone terminal is subscribed.

The step (b) include (b1) requesting a call to the company telephone terminal by using the company telephone number corresponding to the business identification code; and (b2) requesting the call again or requesting a call successively by using another telephone number corresponding to the business identification code in case the company telephone terminal does not answer to the call in the step (b1).

The step (b) includes (b1) requesting a call to the company telephone terminal by using the company telephone number corresponding to the business identification code; (b2) providing a page for inputting whether or not to retry the call or inputting a reserved time for the retrial to the user terminal in case the company telephone terminal does not answer to the call; and (b3) requesting the call to the company telephone terminal instantly or after the reserved time elapses in case the presence of retrial or the reserved time for retrial is inputted through the page of the step (b2) from the user terminal.

The step (b) includes (b1) requesting a call to the company telephone terminal by using the company telephone number corresponding to the business identification code; and (b2) requesting a call to a company telephone terminal of another company belonging to the same category of business in case the company telephone terminal does not answer the call in the step (b1).

In the step (c), in case the company telephone terminal answers to the call and a first channel is established between the call intermediation services providing system and the company telephone terminal, the first channel is put into a standby state, and then a call is requested to the user telephone terminal by using the user telephone number and at the same time the fact that the call is requested is displayed on the user terminal.

The method of the present invention further comprises, after the step (a), determining whether or not a deposit money prepared by the company using a prepayment manner, is equal to or more than a predetermined amount of money, and then performing the step (b) in case that the deposit money is equal to or more than the predetermined amount of money; and further comprises, after the step (f), (g) deducting the call intermediation charge from the deposit money.

The method of the present invention further comprises, after the step (a), determining whether the deposit money prepaid by the company corresponding to the business identification code is equal to or more than the predetermined amount of money, transmitting an announcement informing that, during the standby state of the step (c), the deposit money is exhausted and the call intermediation charge is charged for post-payment to the company telephone terminal in case the deposit money is less than the predetermined amount of money.

A method for providing call intermediation services using a call intermediation services providing system connected to a portal server to mediate a call between a user telephone terminal and a company telephone terminal, the method comprises (a) receiving call intermediation request information including user telephone number and business identification code from the user telephone terminal via the portal server transmitted from a user who confirms company profile provided by the portal server through the user terminal; (b) requesting a call to the company telephone terminal by using company telephone number corresponding to the business identification code; (c) transmitting a short message service including a callback to the company telephone terminal in case the company telephone terminal does not answer to the call; (d) in case the company telephone terminal requests a call to the call intermediation services providing system by using the callback, establishing a first channel between the call intermediation services providing server and the company telephone terminal in response to the call, and then putting the first channel into a standby state and requesting a call to the user telephone terminal by using the user telephone number; (e) in case the user telephone terminal answers to the call and a second channel is established between the call intermediation services providing system and the user telephone terminal, connecting the first channel with the second channel; and (f) calculating a call intermediation charge based on a call intermediation history in case the call is successfully made between the user telephone terminal and the company telephone terminal.

A system for providing call intermediation services between a user telephone terminal and a business telephone terminal, the system comprises a call intermediation request information receipt module for receiving call intermediation request information including a user telephone number and a business identification code from a user terminal via a portal server; a member company information database for storing at least one company telephone number corresponding to the business identification code; a call intermediation module for reading out the company telephone number corresponding to the business identification code from the member company information database, requesting a call to the company telephone terminal by using the company telephone number, requesting a call to the user telephone terminal under the condition that the company telephone terminal answers to the call to establish a first channel, and connecting the first channel with a second channel under the condition that the user telephone terminal answers to the call to establish the second channel; a charge billing module for calculating a call intermediation charge based on a call intermediation history under the condition that the call between the company telephone terminal and the user telephone terminal is successfully made; and a controller for controlling the call intermediation module to connect a call in case the call intermediation request information is received in the call intermediation request information receipt module, controlling the charge billing module to calculate the call intermediation charge based on the call intermediation history, and processing a series of data related to the call intermediation services.

BRIEF DESCRIPTION OF THE DRAWINGS

FIGS. 8 and 9 are exemplary screenshots illustrating a company homepage and a call intermediation request button employed in the method for providing the call intermediation services according to a preferred embodiment of the present invention;

DETAILED DESCRIPTION OF THE INVENTION

Figure 1:
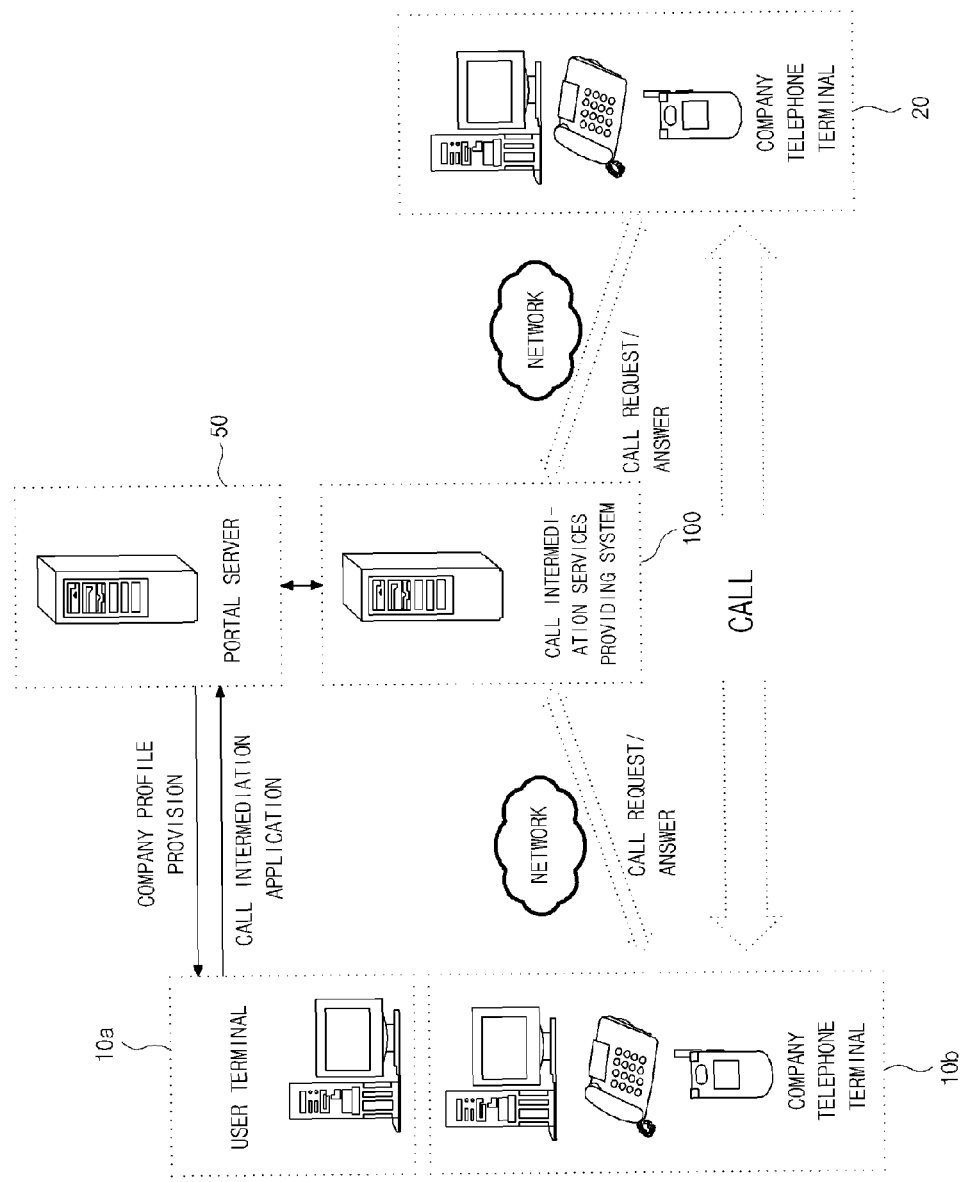
FIG. 1 is a schematic view showing a system for providing the call intermediation services according to a preferred embodiment of the present invention.

Hereinafter, the preferred embodiment is circumstantially explained with reference to the attached drawings. Before the preferred embodiment of the present invention is explained, a term or word used for this specification and claims is not restricted to normal meaning or lexical meaning. Because inventor appropriately can define the concept of a term in order to illustrate his invention with the best method, an invention has to be construed as a meaning and the concept complying with the technical idea. The embodiment of the present invention and the configuration shown in the drawing are exemplary, and do not illustrate all technical ideas of the present invention. Therefore, it should be understood that there may be many equivalents and modifications to be replaced with the above at the point of filing this application.

FIG. 1 is a schematic view showing a system for providing the call intermediation services according to a preferred embodiment of the present invention.

Referring to FIG. 1, the call intermediation services providing system 100 according to the preferred embodiment of the present invention is connected to a portal server 50, a user telephone terminal 10b and a company telephone terminal 20 through an information communication network. In the meantime, the portal server 50 is connected to a user terminal 10a through the information communication network.

The information communication network is comprehensively defined as a data communication network that is interconnected with various networks such as a local area network (LAN), a wide area network (WAN), an Intranet and similar Internal networks, and provides an access to Internet. The information communication network should be understood to include not only wired networks such as a private line and a public switched telephone network (PSTN) but also the mobile radio communication network, and the wireless network such as the satellite communication network and IMT-2000, and a broadband convergence network (BcN).

The user terminal 10a accesses the portal server 50 and receives companies profile from the portal server 50, and requests call intermediation to the portal server 50 for making a telephone call to a specific company. In this embodiment, the user terminal includes a desktop computer, a notebook computer, a personal data assistant (PDA), a cellular phone, a PCS phone and a bidirectional interactive television. However, the present invention is not limited thereto.

The portal server 50, such as Yahoo or Google, is a server that provides company profiles to the user terminal 10a. The portal server 50 receives the call intermediation request information of a specific company from the user terminal 10a, and then transmits the request information to the call intermediation services providing system 100. It is not necessary that the portal server 50 is managed at the same place as the call intermediation services providing system 100 by the same manager. Moreover, a plurality of portal servers 50 can be connected to the call intermediation services providing system 100.

The user telephone terminal 10b is a terminal with which a user may make a call the company telephone terminal 20 through the call intermediation services providing system 100. In this embodiment, a user is a person who accesses the portal server 50 and receives the company profile from the portal server 50 through the user terminal 10a, and then is provided with the call intermediation services through the user telephone terminal 10b. The user telephone terminal 10b may be a common wired phone, a mobile communications terminal (e.g., the cellular phone, the PCS terminal, etc.) as well as a desktop, a notebook, PDA, or the like, which is specified by a telephone number. In some cases, the user telephone terminal 10b can be the user terminal 10a.

In the meantime, in this embodiment, the term 'telephone number' of the user telephone terminal 10b or the company telephone terminal 20 means a numerical code having 8 to 12 digits, which is generally used in the wired communications service and the mobile communications service. In some cases, however, 'telephone number' can be an IP address (e.g., 201.205.128.22) or a set of letters.

The company telephone terminal 20 is a terminal with which a company (or, a member of the company) may make a call to the user telephone terminal 10b through the call intermediation services providing system 100. In this embodiment, the term 'company' is defined to be a company or group whose company profile is registered in the portal server 50, and that is subscribed to the portal server 50 or the call intermediation services providing system 100 for the call intermediation services. The company telephone terminal 20 can be a common wired phone, a mobile communications terminal (e.g., the cellular phone, the PCS terminal, etc.), desktop, notebook, PDA, etc. like the user telephone terminal 10b.

By employing the above network configuration, the call intermediation services providing system 100 according to the preferred embodiment of the present invention provides the call intermediation services between users and a person in charge of a company.

Figure 2:
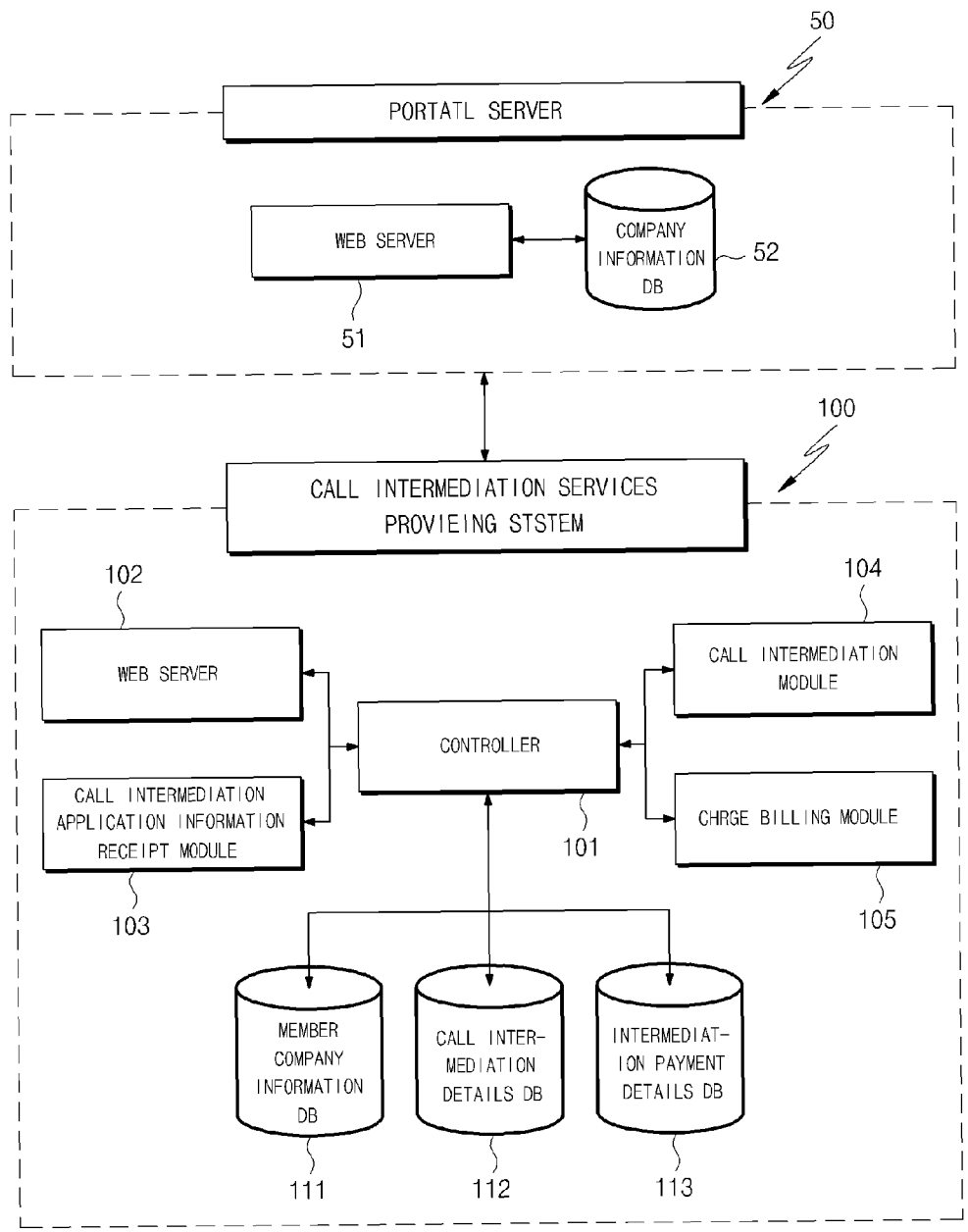
FIG. 2 is a block diagram showing the system for providing the call intermediation services according to a preferred embodiment of the present invention.

FIG. 2 is a block diagram showing a system for providing the call intermediation services according to a preferred embodiment of the present invention. Referring to FIG. 2, the call intermediation services providing system 100 is connected to the portal server 50. The call intermediation services providing system 100 includes a web server 102, a call intermediation request information receipt module 103, a call intermediation module 104 and a charge billing module 105. Moreover, the call intermediation services providing system 100 includes a member company information database 111, a call intermediation details database 112 and a call intermediation payment details database 113 as a database.

Firstly, the portal server 50, receiving the call intermediation services request information from the user terminal 10a, includes a web server 51 and a company information database 52. The portal server 50 provides company profiles to the user terminal 10a.

The company information database 52 of the portal server 50 stores general company profiles such as a firm name, a category of business, a telephone number, location information, a sales commodity information, and an advertisement file as well as information relating to the call intermediation services availability. The call intermediation services availability shows whether or not a corresponding company can be normally subscribed to the call intermediation services, or whether or not a company has a deposit over a predetermined amount of money in case the company has to prepay call intermediation charges. Particularly, in case a charge for call intermediation is imposed on a company as in this embodiment, it is preferable that the call intermediation service is provided only when the corresponding company has already subscribed as a member. And it is preferable that the call intermediation services availability is received in real time from the portal server 50.

According to the request of the user terminal 10a, the web server 51 provides the company profile to the user terminal 10a. When the user terminal 10a requests search for company profiles, the web server 51 reads out the company profile satisfying search conditions from the company information database 52, and then provides it to the user terminal 10a. In some cases, the company profile of a specific company can be provided to the user terminal 10a through the banner ad, etc. But the present invention is not limited thereto. The company profile includes the call intermediation services availability, and it is preferable that the call intermediation services availability is displayed on the user telephone number input window.

If receiving the call intermediation request information including the user telephone number and the business identification code, the web server 51 transmits it to the call intermediation services providing system 100.

Hereinafter, the call intermediation services providing system 100 connected to the portal server 50 is explained in more detail.

If the call intermediation request information is received from the call intermediation request information receipt module 103, a controller 101 of the call intermediation services providing system 100 calls the call intermediation module 104 to connect the call. Moreover, the controller 101 calls the charge billing module 105 to calculate a call intermediation charge based on the call intermediation history. As mentioned above, the controller 101 processes a series of data related to the call intermediation services.

The web server 102 provides pages required for providing the call intermediation services to the user terminal 10a. For example, while call intermediation is tried between the company telephone terminal 20 and the user telephone terminal 10b, the web server 102 may provide a call intermediation status page (including call request situation and requested call responding situation to the company telephone terminal 20 or the user telephone terminal 10b, for example) to the user terminal 10a Moreover, while the company telephone terminal 20 is in link with the user telephone terminal 10b, the web server 102 may provide the detailed information of the company to the user terminal 10a.

The call intermediation request information receipt module 103 receives the call intermediation request information including the user telephone number and the business identification code from the portal server 50, and stores it in the call intermediation details database 112. In some cases, the company telephone number can be used as the business identification code.

The call intermediation module 104 mediates a call between the user telephone terminal 10b and the company telephone terminal 20. Concretely, the call intermediation module 104 reads out the company telephone number corresponding to the business identification code from the member company information database 111, and requests a call to the company telephone terminal 20 by using the company telephone number. The call intermediation module 104 requests a call to the user telephone terminal 10b under the condition that the company telephone terminal 20 forms a first channel. Next, if the user telephone terminal 10b forms a second channel in response to the call, the call intermediation module 104 connects the first channel and the second channel to enable the call between the user telephone terminal 10b and the company telephone terminal 20.

The call intermediation module 104 can be implemented using the conference call service technology based on computer and telephony integration (CTI) technology (e.g., see Korean Patent Registration No. 0383329), or using the conference call (multilateral double-talk) technology (e.g., see Korean Laid-open Patent Application No. 2004-28005) based on the VoIP (Voice over Internet Protocol) technology. However, the present invention is not limited thereto.

In case the call between the company telephone terminal 20 and the user telephone terminal is successfully made by the call intermediation module 104, the charge billing module 105 calculates a call intermediation charge based on the call intermediation history. The call intermediation charge can be calculated in proportion to conversation time and/or the number of telephone calls. The call intermediation charge calculated by the charge billing module 105 is generally imposed on the company in a manner or prepayment or post-payment. In some cases, however, the call intermediation charge can be imposed on a user by making the user watch advertisements and then deducting the call intermediation charge from rewards gained by watching the advertisements.

The member company information database 111 stores the information of the company subscribed to the call intermediation services among companies stored in the company information database 52 of the portal server 50. Concretely, the member company information database 111 stores the business identification code, company telephone number (including telephone numbers of reserved telephones), firm name, category of business (or the business code), homepage URL (uniform resource locator), E-mail address, instant messenger account, call intermediation fee payment mode (prepayment/post-payment), deposit money, etc.

The call intermediation details database 112 stores information for the call intermediation, which is required by the call intermediation services providing system 100 for call intermediation between the user telephone terminal 10b and the company telephone terminal 20. Concretely, the call intermediation details database 112 stores the call intermediation request identification code, call intermediation request information (the user telephone number, business identification code, and the request day and time), call request information (the call request day and time, the call response day and time, and the answered company telephone number) to the company telephone terminal, call request information (the call request day and time, and the call response day and time) to the user telephone terminal, the call connection day and time, the conversation time, etc. In some cases, because the present invention is implemented in the mode of the multilateral double-talk, the call intermediation details database 112 can store the conversation content itself between a user and a person in charge of a company.

The call intermediation payment details database 113 stores the call intermediation billing information calculated by the charge billing module 105. Concretely, the call intermediation payment details database 113 stores the business identification code (the user identification code), call intermediation request identification code, call intermediation charge, whether or not billing for the call intermediation fee, whether or not the call intermediation fee is paid.

By including the above-described components, the present invention can provide the call intermediation services between a company and a user.

Figure 3:
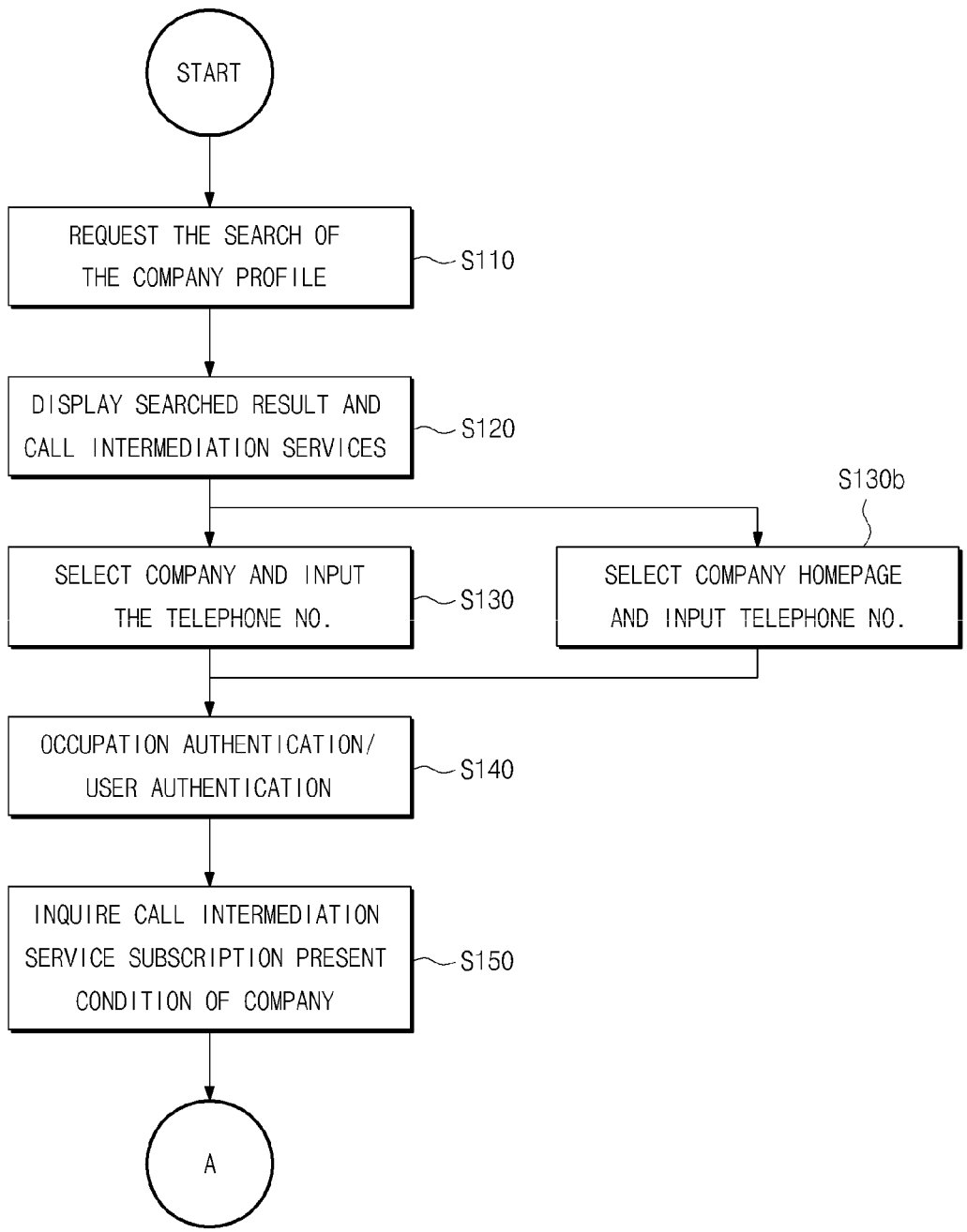
FIGS. 3 and 4 are flowcharts illustrating a method for providing the call intermediation services according to a preferred embodiment of the present invention.
Figure 4:
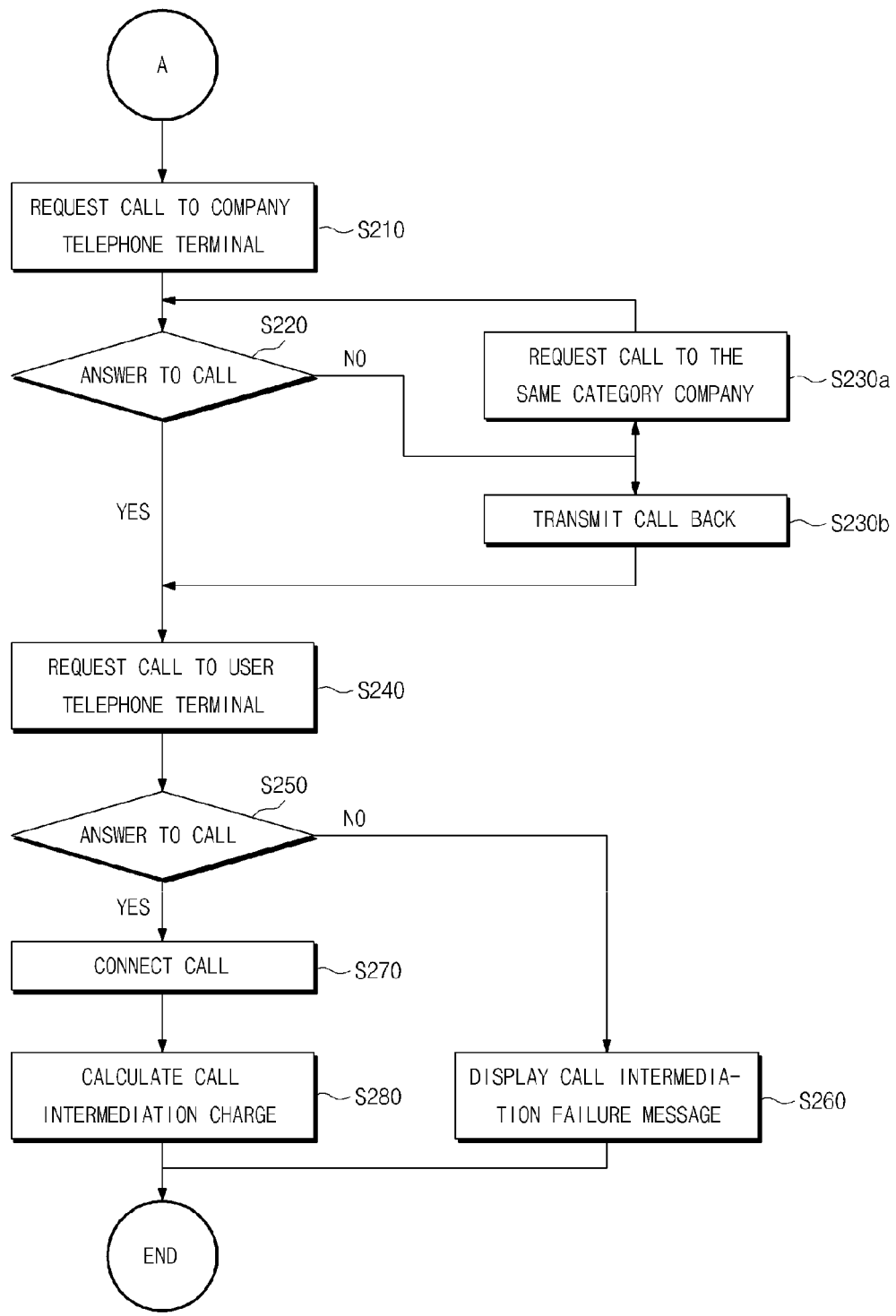
Figure 5:
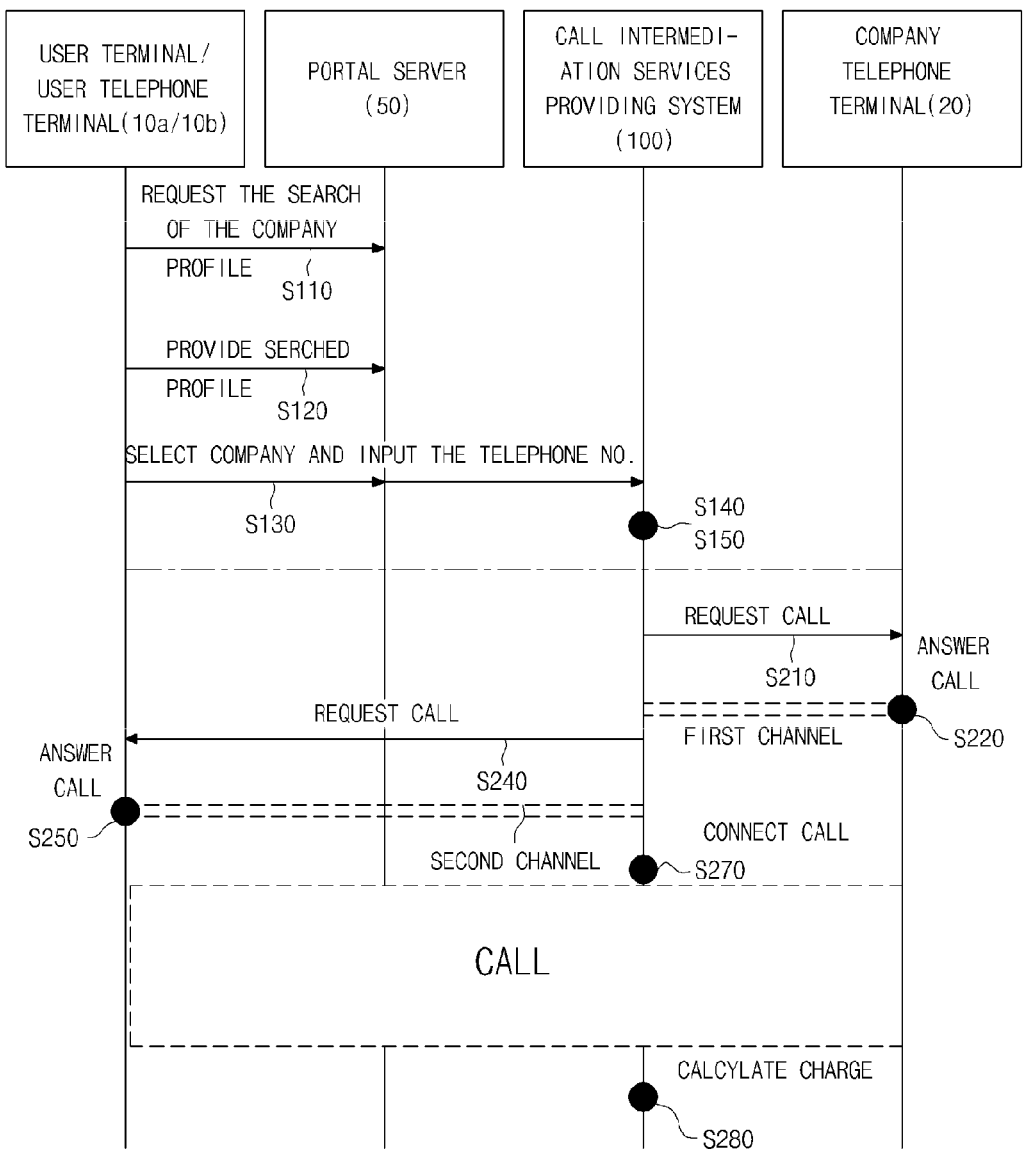
FIG. 5 is a diagram showing each step of the method for providing the call intermediation services according to a preferred embodiment of the present invention, based on network subjects.

FIGS. 3 and 4 are flowcharts illustrating a method for providing the call intermediation services according to a preferred embodiment of the present invention, and FIG. 5 shows each step of the method for providing the call intermediation services according to a preferred embodiment of the present invention, based on the network subjects. As shown in FIGS. 3 and 5, firstly, a user accesses the portal server 50 by using the user terminal 10a, and then requests search for the company profile in step S110. In this embodiment, the company profile includes the firm name (e.g., "GREEN"), category of business (e.g., flower delivery service), telephone number (e.g., 051-327-4557), the location information, etc.

Figure 6:
FIG. 6 is an exemplary screenshot illustrating a page containing company profile search results and an input button of a user telephone number employed in the method for providing the call intermediation services according to a preferred embodiment of the present invention.

And then, the portal server 50 provides the company profile according to the user's search request to the user terminal 10a, and indicates availability call intermediation service of each company and/or a link to the homepage of each company at the same time in step S120. FIG. 6 is an exemplary screenshot illustrating the company profile search result and the input button of a user telephone number according to the method for providing the call intermediation services according to the preferred embodiment of the present invention. As shown in FIG. 6, it is preferable that the call intermediation services availability is displayed using the input button of the user telephone number.

Figure 7:
FIG. 7 is an exemplary screenshot illustrating a company selection and user telephone number input page employed in the method for providing the call intermediation services according to a preferred embodiment of the present invention.

If a user selects one of companies which can provide the call intermediation services and then requests the call intermediation, the portal server 50 provides the input page of the user telephone number to the user terminal 10a. At this time, if the cookie file of the portal server 50 exists in the user terminal 10a, it is preferable that the user telephone number stored in the cookie file is displayed in the input page. And then, the user inputs the telephone number of the user telephone terminal 10b, which a user desires to receive a call, in the input page of the user telephone number in step S130. In step S120, when the portal server 50 displays the call intermediation services availability using the input button of the user telephone number, the user inputs the user telephone number corresponding to the specific company information in the input button of the user telephone number. Consequently, the user can input the user telephone number and company selection at the same time. FIG. 7 is an exemplary screenshot for illustrating a company selection and a user telephone number input page employed in the method for providing the call intermediation services according to the preferred embodiment of the present invention.

Figure 8:
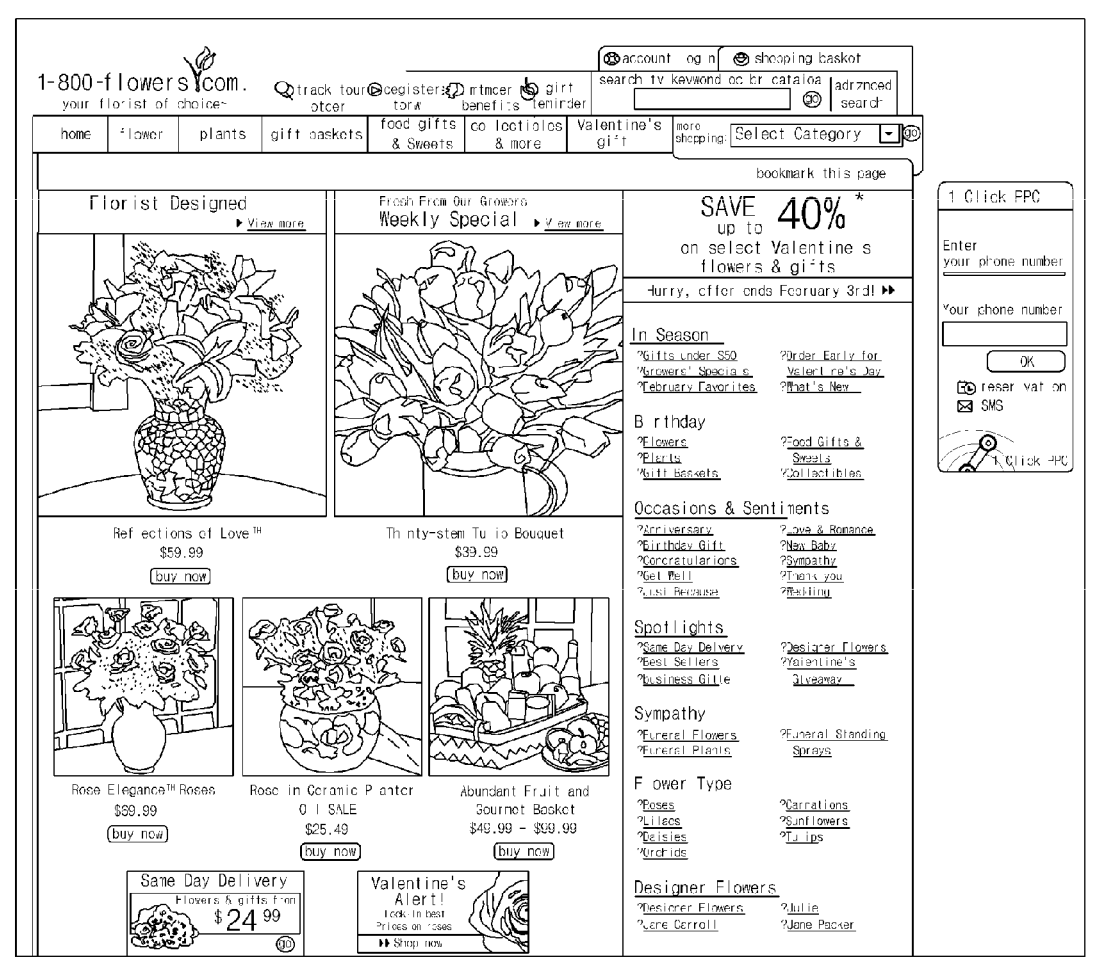
Figure 9:
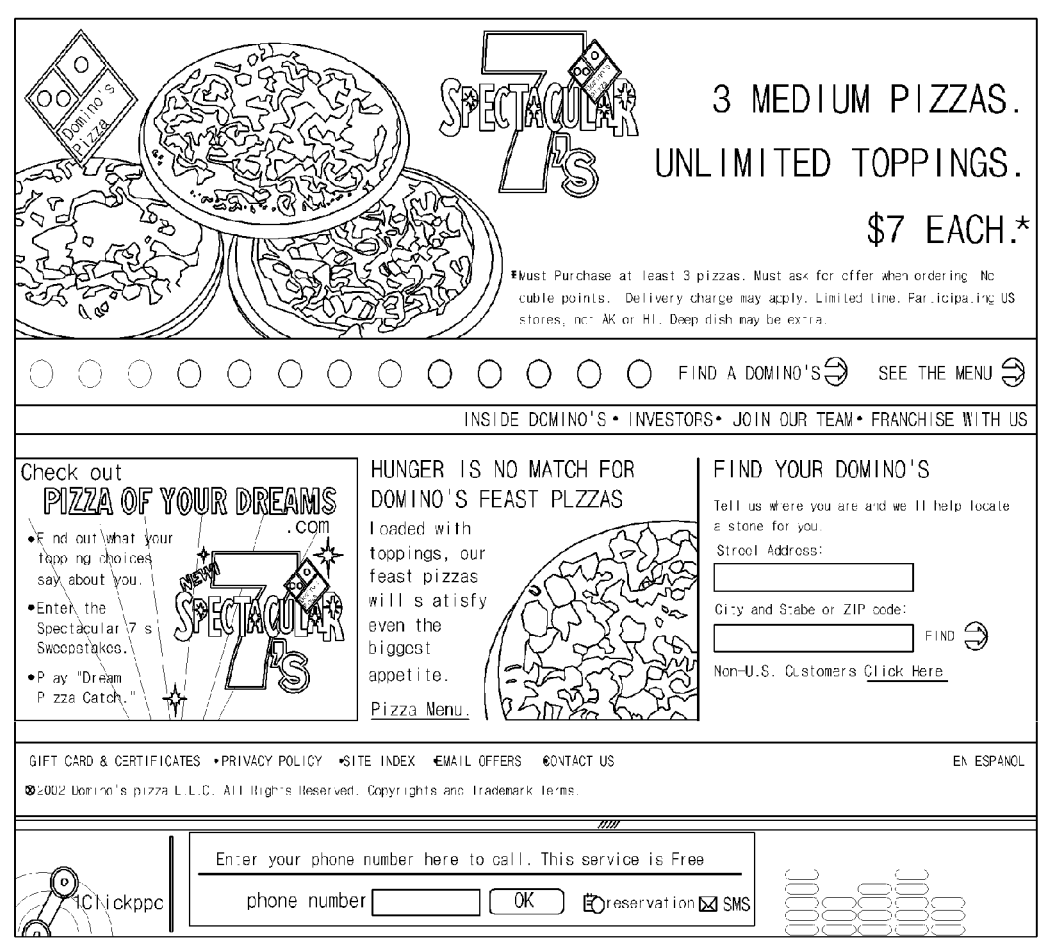

In the meantime, in step S120, instead of requesting the call intermediation as in step S130 after being provided with the company profile search result from the portal server 50, a user can select the link of the homepage of the specific company. At this time, the portal server 50 provides the homepage of the corresponding company to the user terminal 10a and provides the call intermediation request button for the call intermediation request at the same time. FIGS. 8 and 9 are exemplary screenshots for illustrating a company homepage and a call request button employed in the method for providing the call intermediation services according to the preferred embodiment of the present invention. In this embodiment, when the homepage and the call intermediation request button of the corresponding company are provided simultaneously, a frame link mode can be used. However, the present invention is not limited thereto. And then, a user selects the call intermediation request button to request for the call intermediation, and inputs the telephone number of the user telephone terminal 10b, which the user desires to receive a call, in step S130b.

In step S130 or S130b, if a user inputs the company selection and the user telephone number, the call intermediation request information including the user telephone number and the business identification code is transmitted from the user terminal 10a via the portal server 50 to the call intermediation services providing system 100.

And then, the call intermediation services providing system 100 performs occupancy authentication or user authentication of the user telephone terminal 10b in step S140.

The occupancy authentication is a process for confirming whether or not the user possesses the user telephone terminal 10b at the present. There are various modes for the occupancy authentication, and one example is as follows.

In case of using ARS, the occupancy authentication is made by confirming whether or not an authentication number transmitted to the user telephone terminal 10b by means of ARS is coincided with an authentication number inputted through the user terminal 10a.

In case the user telephone terminal 10b is a mobile communications terminal, the occupancy authentication is made by confirming whether or not an authentication number transmitted to the user telephone terminal 10b as a short message is coincided with an authentication number inputted through the user terminal 10a.

The user authentication is a process for confirming whether or not a user is an authentic subscriber of the user telephone terminal 10b. Concretely, the call intermediation services providing system 100 receives the identification code of the subscriber (e.g., subscriber's social security number) of the user telephone terminal 10b, and then transmits it to a communications corporation server (e.g., public switched telephone network business server, or a server of a mobile network operator) for which the user telephone terminal is subscribed. Next, the call intermediation services providing system 100 requests whether or not the user is a subscriber, and then receives the result. Consequently, the user authentication is performed.

In step S140, by performing the occupancy authentication or the user authentication, the call intermediation services providing system 100 can prevent any user from requesting unnecessary call intermediation.

After step S140, the call intermediation services providing system 100, in step S150, inquires the call intermediation service subscription status of the company which the user selects in step S130. Additionally, in case the company uses the prepayment mode, the call intermediation services providing system 100 determines whether or not the deposit money of the company is equal to or more than a predetermined amount of money, and then proceeds to the next step or transmits an announcement to the company telephone terminal 20 in case the deposit money is equal to or more than the predetermined amount of money in step S240.

As mentioned above, by performing step 110 through step S150, the call intermediation services providing system 100 receives the call intermediation request from the user terminal 10a.

Next, the call intermediation services providing system 100 performs the call intermediation between the company telephone terminal 20 and the user telephone terminal 10b by step S210 through step S280. Hereinafter, referring to FIGS. 4 and 5, step S210 through S280 are explained in detail.

Figure 10:
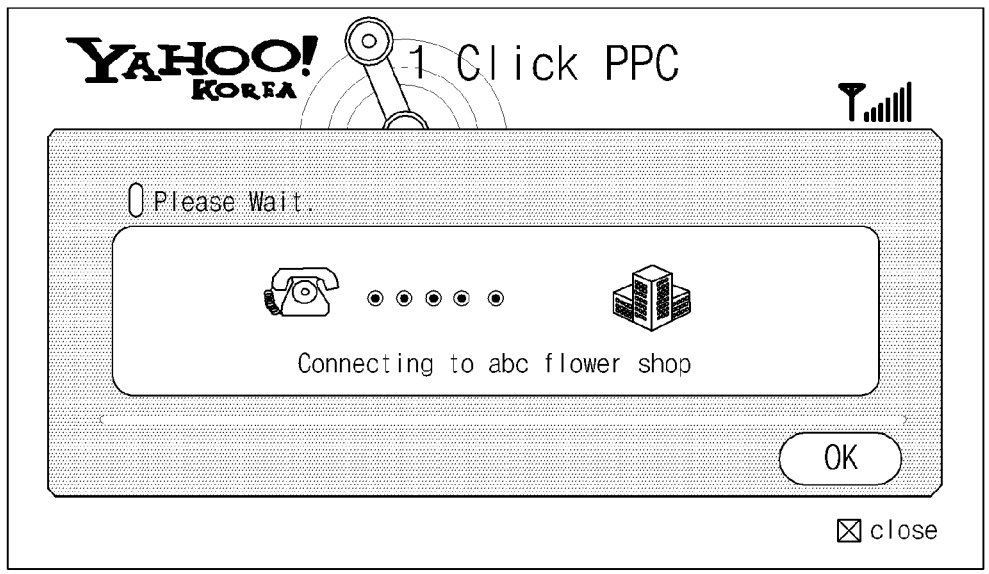
FIGS. 10 through 12 are exemplary pages for a user to request a call dialing to a company telephone terminal employed in the method for providing the call intermediation services according to a preferred embodiment of the present invention.
Figure 11:
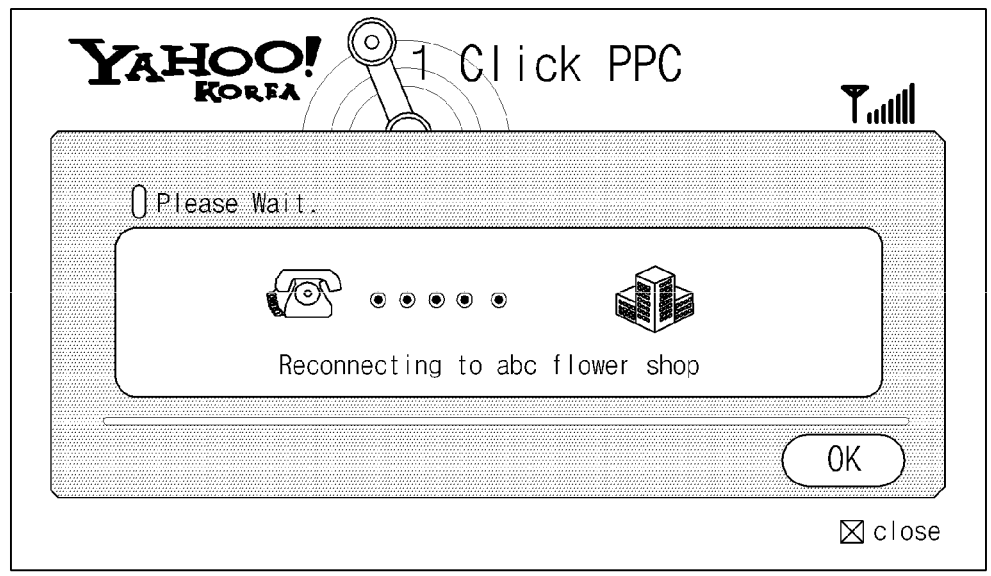
Figure 12:
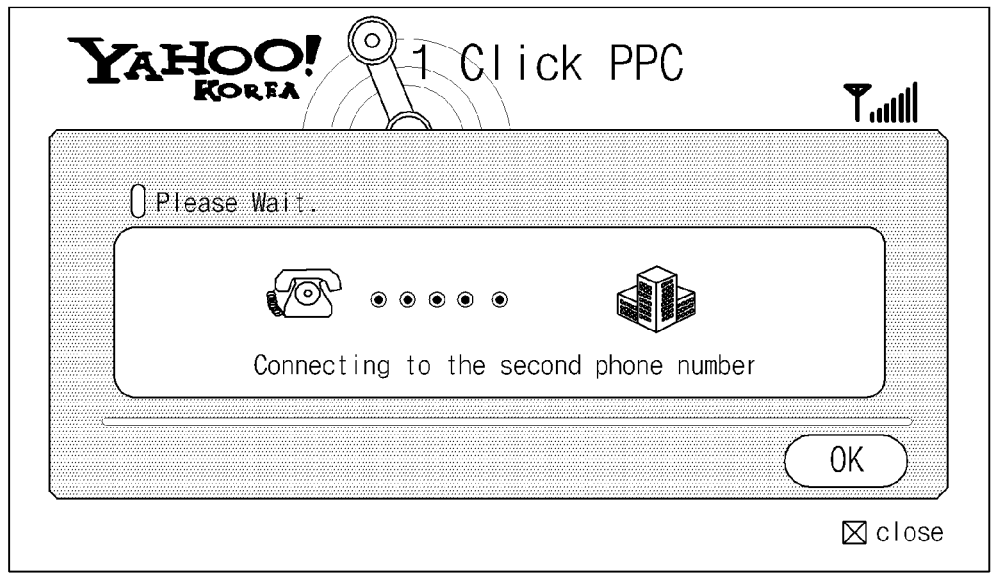

Firstly, in step S210, the call intermediation services providing system 100 requests a call to the company telephone terminal 20 by using the company telephone number corresponding to the business identification code of step S130. When the company telephone terminal 20 does not answer to the call, the call intermediation services providing system 100 requests the call again (or, redials) by using the telephone number or requests the call successively by using other telephone number (reserved number) corresponding to the business identification code. FIGS. 10 through 12 are exemplary pages for requesting the call dialing by a company telephone terminal of a method for providing the call intermediation services according to the preferred embodiment of the present invention.

When the company telephone terminal 20 does not answer to the call within a predetermined time, a page for inputting whether or not to retry the call or inputting reserved time for the retrial is provided to the user telephone terminal 10a. Next, if the presence of retrial and the reserved time for retrial are inputted in the page, the call intermediation services providing system 100 preferably requests the call again to the company telephone terminal 20 when the reserved time elapses.

Next, the call intermediation services providing system 100 determines whether or not the company telephone terminal 20 answers to the call finally in step S220.

When the company telephone terminal 20 does not answer to the call, the call intermediation services providing system 100 can request the call to telephone terminal 20 of other company belonging to the same category of business as the company in step S230a. At this time, it is preferable to display a call to the company telephone terminal 20 of another company of the same kind is requested, on the user terminal 10a. Step S240 is performed in case the company telephone terminal 20 of another company answers to the call.

Moreover, in case the company telephone terminal 20 does not answer to the call ("NO" in step S220), a message including a callback can be transmitted to the company telephone terminal 20 in step S230b. If a person in charge of a company telephones the call intermediation services providing system 100, a call intermediation with the user telephone terminal 10b is automatically requested and then step S240 is performed.

Figure 13:
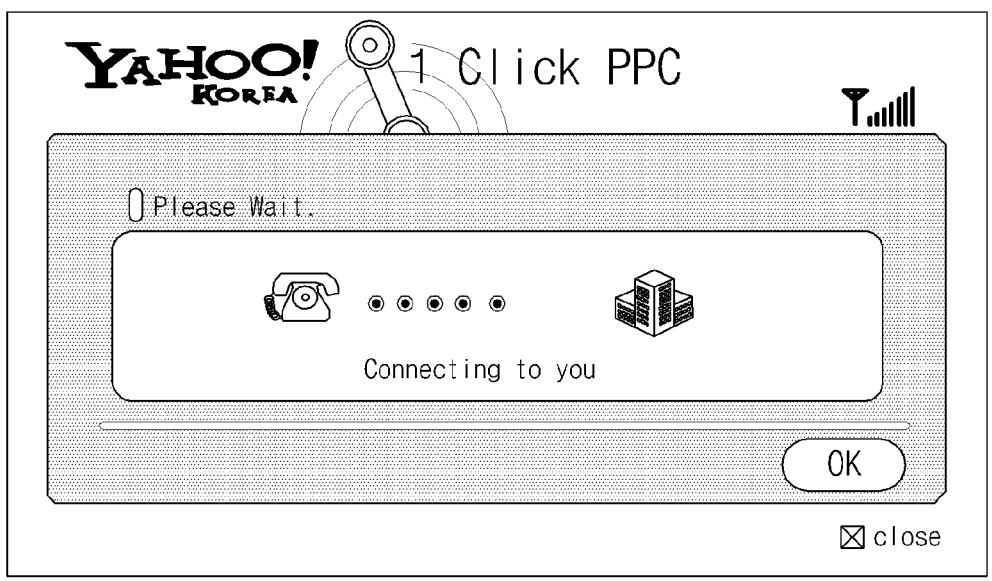
FIG. 13 is an exemplary page illustrating the process of requesting a call dialing to a user telephone terminal employed in the method for providing the call intermediation services according to a preferred embodiment of the present invention.

On the contrary, in step S220, in case the company telephone terminal 20 answers to the call ("YES" in step S220), after putting a first channel formed between the company telephone terminals 20 into a standby state for a while, the call intermediation services providing system 100 requests a call to the user telephone terminal 10b in step S240. It is preferable that the fact of the call request is also displayed on the user terminal 10a. FIG. 13 is an exemplary page for requesting the call dialing by a user telephone terminal employed in the method for providing the call intermediation services according to the preferred embodiment of the present invention.

If it is inquired in step S150 that the deposit money is all exhausted even though the company uses a prepayment mode, the call intermediation services providing system 100 transmits an announcement informing that the deposit money is exhausted and the call intermediation charge is charged for post-payment to the company telephone terminal 20 instead of transmitting the ring back tone to the company telephone terminal 20, while requesting the call to the user telephone terminal 10b.

Next, in step S250, the call intermediation services providing system 100 determines whether or not the user telephone terminal 10b answers to the call requested in step S240.

If the user telephone terminal 10b does not answer to the call of the call intermediation services providing system 100 ("NO" in step S250), a call intermediation failure message is displayed on the user terminal 10a and then the call intermediation service ends in step S260. Next, it is possible to return to step S240, and then ask a call again to the user telephone terminal 10b.

Figure 14:
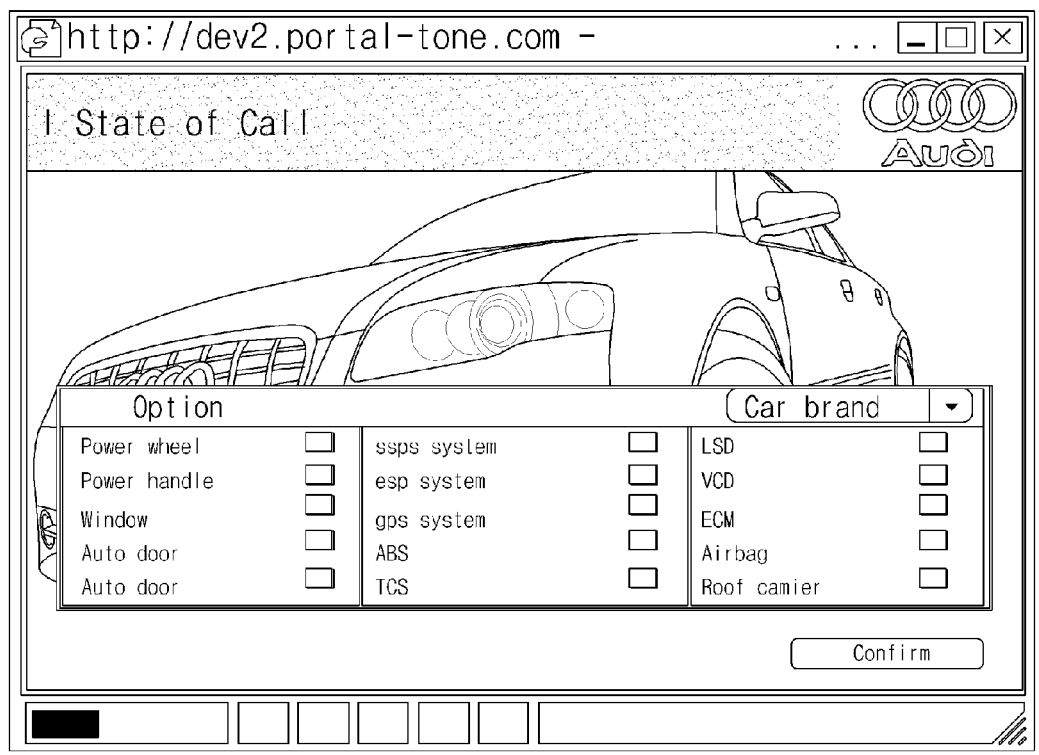
FIG. 14 is an exemplary screenshot illustrating a detailed company information service page employed in the method for providing the call intermediation services according to a preferred embodiment of the present invention.

On the contrary, in case the user telephone terminal 10b answers to the call of the call intermediation services providing system 100 ("YES" in step S250), the call intermediation services providing system 100 connects a second channel formed between the call intermediation services providing system 100 and user telephone terminal 10b with the first channel which is in the standby state in step S240 to establish the call between the user telephone terminal 10b and the company telephone terminal 20 in step S270. At this time, the call intermediation services providing system 100 can provide the detailed information (e.g., the commodity information, the location information, etc.) about the company to the user telephone terminal 10a during the call between the company telephone terminal 20 and the user telephone terminal 10b. FIG. 14 is an exemplary screenshot illustrating the detail information service page of a company employed in the method for providing the call intermediation services according to a preferred embodiment of the present invention.

In step S270, if the call between the company telephone terminal 20 and the user telephone terminal 10b is successfully made, the call intermediation services providing system 100 calculates the call intermediation charge based on the call intermediation history in step S280.

The call intermediation service providing method according to the present invention provides the call intermediation service which can allow a user to be a receiver and speak by telephone with the person in charge of a company without a waiting time for call connection by the above mentioned process.

While the present invention has been described in detail with its preferred embodiments, it will be understood that further modifications are possible. The present application is therefore intended to cover any variations, uses or adaptations of the invention, following the general principles thereof, and includes such departures from the present disclosure as come within known or customary practice in the art to which this invention pertains, within the limits of the appended claims.

According to the present invention, after confirming the company profile from the Internet portal site, a user can speak by telephone directly with a person in charge of a company on inputting the telephone number that the user desires to receive a call, and then can rapidly acquire desired information by means of query and response.

Moreover, because a user is a receiver in connecting a user telephone terminal to a company telephone terminal, the user can speak by telephone with a person in charge of a company without a waiting time for call connection.

Moreover, because a user subscribes to the call intermediation services connected with the company profile, a company can get an advertisement and PR effect, and especially the company can enjoy instant increase of selling in case the company gives order-based delivery service.

Moreover, the call intermediation services providing system can easily calculate the call intermediation charge since the system may grasp the conversation content as a main subject in mediating a call between a user and a person in charge of a company. In this regards, the call intermediation services providing system may collects the conversation contents between a user and a business and then utilize it as a basis for determining quality and effects of the call intermediation services. In another aspect of the present invention, a solution for new advertisement manner may be provided to many companies beyond the conventional advertisements such as keyword advertisement, exposure advertisement and existing on-line advertisement, so it is possible to create a profit from the call intermediation charges.

What is claimed is:

1. A method for providing call intermediation services using a call intermediation services providing system connected to a portal server to mediate a call between a user telephone terminal and a company telephone terminal, the method comprising:
   (a) receiving call intermediation request information including user telephone number and business identification code from the user telephone terminal via the portal server transmitted from a user who confirms company profile provided by the portal server through the user terminal;
   (b) requesting a call to the company telephone terminal by using company telephone number corresponding to the business identification code;
   (c) in case the company telephone terminal answers to the call and then a first channel is established between the call intermediation services providing system and the company telephone terminal in response to the call, putting the first channel into a standby state and requesting a call to the user telephone terminal by using the user telephone-number;
   (d) in case the user telephone terminal answers to the call and then a second channel is established between the call intermediation services providing system and the user telephone terminal, connecting the first channel with the second channel; and
   (e) calculating a call intermediation charge based on a call intermediation history in case the call is successfully made between the user telephone terminal and the company telephone terminal.

2. The method of claim 1, wherein the step (a) includes:
   (a1) the portal server receiving a request for searching company profile from a user who accesses the portal server using the user terminal;
   (a2) the portal server providing the searched company profile and call intermediation services availability of each company to the user terminal;
   (a3) the portal server providing a page for inputting user telephone number, which is an identification code of the user telephone terminal, to the user terminal in case the user selects any company profile and then requests for the call intermediation by using the user terminal;
   (a4) the portal server receiving a user telephone number from the user terminal in case the user inputs the user telephone number through the input page; and
   (a5) the call intermediation services providing system receiving call intermediation request information including the identification code of the company chosen by the user and the user telephone number from the user terminal in case the portal site transmits the call intermediation request information.

3. The method of claim 2, wherein, in the step (a3), in case the portal server confirms whether a user account or cookie file for the portal server exists in the user terminal or the portal server and it is confirmed that the cookie file exists, the portal server provides a user telephone number stored in the user account or cookie file to the user terminal together with a page for inputting a user telephone number that is an identification code of the user telephone terminal.

4. The method of claim 1, wherein the step (a) includes:
   (a1) the portal server receiving a request for searching company profile from a user who accesses the portal server using the user terminal;
   (a2) the portal server providing the searched company profile, a homepage link of each company and the call intermediation services availability of each company to the user terminal;
   (a3) the portal server providing a homepage of the company and a call intermediation request button for the intermediation request to the user terminal in case the user selects the homepage link of the specific company through the user terminal;
   (a4) the portal server providing a page for inputting a user telephone number, which is an identification code of the user telephone terminal, to the user terminal in case the user selects the call intermediation request button and requests for the call intermediation;

(a5) the portal server receiving a user telephone number from the user terminal in case the user inputs the user telephone number through the input page; and (a6) the call intermediation services providing system receiving call intermediation request information including the identification code of the company chosen by the user and the user telephone number in case the portal server transmits the call intermediation request information.

5. The method of claim 1, after the step (a) and before the step (b), further comprising:

the call intermediation services providing system confirming whether or not the user possesses the user telephone terminal by confirming whether an authentication number transmitted to the user telephone terminal is coincided with an authentication number inputted through the user terminal or not in case ARS (Automatic Response Service) is used, or by confirming whether an authentication number transmitted to the user telephone terminal in a short message is coincided with an authentication number inputted through the user terminal or not in case a mobile communications terminal is used.

6. The method of claim 2, after the step (a) and before the step (b), further comprising:

the call intermediation services providing system confirming whether or not the user possesses the user telephone terminal by confirming whether an authentication number transmitted to the user telephone terminal is coincided with an authentication number inputted through the user terminal or not in case ARS (Automatic Response Service) is used, or by confirming whether an authentication number transmitted to the user telephone terminal in a short message is coincided with an authentication number inputted through the user terminal or not in case a mobile communications terminal is used.

7. The method of claim 4, after the step (a) and before the step (b), further comprising:

the call intermediation services providing system confirming whether or not the user possesses the user telephone terminal by confirming whether an authentication number transmitted to the user telephone terminal is coincided with an authentication number inputted through the user terminal or not in case ARS (Automatic Response Service) is used, or by confirming whether an authentication number transmitted to the user telephone terminal in a short message is coincided with an authentication number inputted through the user terminal or not in case a mobile communications terminal is used.

8. The method of claim 1, after the step (a) and before the step (b), further comprising;

the call intermediation services providing system confirming whether or not the user is an authentic subscriber of the user telephone terminal by receiving an identification code of the subscriber of the user telephone terminal from the user telephone terminal and transmitting the identification code of the subscriber of the user telephone terminal to a communications corporation server in which the user telephone terminal is subscribed.

9. The method of claim 2, after the step (a) and before the step (b), further comprising;

the call intermediation services providing system confirming whether or not the user is an authentic subscriber of the user telephone terminal by receiving an identification code of the subscriber of the user telephone terminal from the user telephone terminal and transmitting the identification code of the subscriber of the user telephone terminal to a communications corporation server in which the user telephone terminal is subscribed.

10. The method of claim 4, after the step (a) and before the step (b), further comprising;

the call intermediation services providing system confirming whether or not the user is an authentic subscriber of the user telephone terminal by receiving an identification code of the subscriber of the user telephone terminal from the user telephone terminal and transmitting the identification code of the subscriber of the user telephone terminal to a communications corporation server in which the user telephone terminal is subscribed.

11. The method of claim 1, wherein the step (b) includes:

(b1) requesting a call to the company telephone terminal by using the company telephone number corresponding to the business identification code; and (b2) requesting the call again or requesting a call successively by using another telephone number corresponding to the business identification code in case the company telephone terminal does not answer to the call in the step (b1).

12. The method of claim 1, wherein the step (b) includes:

(b1) requesting a call to the company telephone terminal by using the company telephone number corresponding to the business identification code;

(b2) providing a page for inputting whether or not to retry the call or inputting a reserved time for the retrial to the user terminal in case the company telephone terminal does not answer to the call; and (b3) requesting the call to the company telephone terminal instantly or after the reserved time elapses in case the presence of retrial or the reserved time for retrial is inputted through the page of the step (b2) from the user terminal.

13. The method of claim 1, wherein the step (b) includes:

(b1) requesting a call to the company telephone terminal by using the company telephone number corresponding to the business identification code; and (b2) requesting a call to a company telephone terminal of another company belonging to the same category of business in case the company telephone terminal does not answer the call in the step (b1).

14. The method of claim 1, wherein, in the step (c), in case the company telephone terminal answers to the call and a first channel is established between the call intermediation services providing system and the company telephone terminal, the first channel is put into a standby state, and then a call is requested to the user telephone terminal by using the user telephone number and at the same time the fact that the call is requested is displayed on the user terminal.

15. The method of claim 1, further comprising, after the step (a);

determining whether or not a deposit money prepared by the company using a prepayment manner, is equal to or more than a predetermined amount of money, and then performing the step (b) in case that the deposit money is equal to or more than the predetermined amount of money; and further comprising, after the step (e);

(f) deducting the call intermediation charge from the deposit money.

16. The method of claim 1, further comprising, after the step (a);

determining whether the deposit money prepaid by the company corresponding to the business identification code is equal to or more than the predetermined amount of money, transmitting an announcement informing that, during the standby state of the step (c), the deposit money is exhausted and the the call intermediation charge is charged for post-payment to the company telephone terminal in case the deposit money is less than the predetermined amount of money.

17. A method for providing call intermediation services using a call intermediation services providing system connected to a portal server to mediate a call between a user telephone terminal and a company telephone terminal, the method comprising:

(a) receiving call intermediation request information including user telephone number and business identification code from the user telephone terminal via the portal server transmitted from a user who confirms company profile provided by the portal server through the user terminal;

(b) requesting a call to the company telephone terminal by using company telephone number corresponding to the business identification code;

(c) transmitting a short message service including a callback to the company telephone terminal in case the company telephone terminal does not answer to the call;

(d) in case the company telephone terminal requests a call to the call intermediation services providing system by using the callback, establishing a first channel between the call intermediation services providing server and the company telephone terminal in response to the call, and then putting the first channel into a standby state and requesting a call to the user telephone terminal by using the user telephone number;

(e) in case the user telephone terminal answers to the call and a second channel is established between the call intermediation services providing system and the user telephone terminal, connecting the first channel with the second channel; and (f) calculating a call intermediation charge based on a call intermediation history in case the call is successfully made between the user telephone terminal and the company telephone terminal.

18. A system for providing call intermediation services between a user telephone terminal and a business telephone terminal, the system comprising;

a call intermediation request information receipt module for receiving call intermediation request information including a user telephone number and a business identification code from a user terminal via a portal server;

a member company information database for storing at least one company telephone number corresponding to the business identification code;

a call intermediation module for reading out the company telephone number corresponding to the business identification code from the member company information database, requesting a call to the company telephone terminal by using the company telephone number, requesting a call to the user telephone terminal under the condition that the company telephone terminal answers to the call to establish a first channel, and connecting the first channel with a second channel under the condition that the user telephone terminal answers to the call to establish the second channel;

a charge billing module for calculating a call intermediation charge based on a call intermediation history under the condition that the call between the company telephone terminal and the user telephone terminal is successfully made; and a controller for controlling the call intermediation module to connect a call in case the call intermediation request information is received in the call intermediation request information receipt module, controlling the charge billing module to calculate the call intermediation charge based on the call intermediation history, and processing a series of data related to the call intermediation services.

19. The system of claim 18, wherein the controller make a web server provide the detailed information (e.g., the commodity information, the location information, etc.) of the company for the user terminal 10a whenever specific button of the company telephone terminal 20 is pushed.

* * * * *

UNITED STATES PATENT AND TRADEMARK OFFICE
CERTIFICATE OF CORRECTION

| | |
|---|---|
| PATENT NO. | : 7,724,882 B2 |
| APPLICATION NO. | : 11/353322 |
| DATED | : May 25, 2010 |
| INVENTOR(S) | : Phil Hwan Yun |

It is certified that error appears in the above-identified patent and that said Letters Patent is hereby corrected as shown below:

Col. 14, line 13, --telephone-number-- should read "telephone number".

Signed and Sealed this

Second Day of November, 2010

David J. Kappos
*Director of the United States Patent and Trademark Office*